United States Patent
Tang et al.

(10) Patent No.: US 12,385,939 B2
(45) Date of Patent: Aug. 12, 2025

(54) LOW-POWER ELECTRONIC PIPETTE

(71) Applicant: Mettler-Toledo Instruments (Shanghai) Co. Ltd, Shanghai (CN)

(72) Inventors: Jin Tang, Nantong (CN); Changlin Wang, Shanghai (CN); Zhenhua Lin, Shanghai (CN); Chengyang Ye, Shanghai (CN); Fanfeng Zu, Shanghai (CN); Xiaoling Zhou, Shanghai (CN); Yingzhen Tong, Shanghai (CN); Bo Zhao, Changzhou (CN); ShuYi Xu, Changzhou (CN); Bo Zhou, Wuxi (CN)

(73) Assignee: Mettler-Toledo Instruments (Shanghai) Co. Ltd, Shanghai (CN)

( * ) Notice: Subject to any disclaimer, the term of this patent is extended or adjusted under 35 U.S.C. 154(b) by 1009 days.

(21) Appl. No.: 17/304,465

(22) Filed: Jun. 22, 2021

(65) Prior Publication Data

US 2021/0405080 A1   Dec. 30, 2021

(30) Foreign Application Priority Data

Jun. 23, 2020   (CN) .......................... 202010582203.1

(51) Int. Cl.
| | | |
|---|---|---|
| G01N 35/10 | (2006.01) | |
| G01N 35/00 | (2006.01) | |
| H04W 4/80 | (2018.01) | |

(52) U.S. Cl.
CPC ... G01N 35/1009 (2013.01); G01N 35/00722 (2013.01); *G01N 2035/00891* (2013.01); *H04W 4/80* (2018.02)

(58) Field of Classification Search
CPC ......... G01N 35/00722; G01N 35/1009; G01N 2035/00891; H04W 4/80; B01L 3/0237;
(Continued)

(56) References Cited

U.S. PATENT DOCUMENTS

| | | |
|---|---|---|
| 9,579,645 B2 | 2/2017 | Reichmuth et al. |
| 2005/0118069 A1* | 6/2005 | Solotareff ............. B01L 3/0237 436/180 |

(Continued)

FOREIGN PATENT DOCUMENTS

| | | |
|---|---|---|
| EP | 0576967 A2 | 1/1994 |
| EP | 2923650 A1 | 9/2015 |

OTHER PUBLICATIONS

Rainin Instrument, LLC, Operating Instructions, E4 XLS Electronic Pipettes, Advanced Electronic Pipette with RFID, 2011, 64 pages.

*Primary Examiner* — Shogo Sasaki
(74) *Attorney, Agent, or Firm* — Standley Law Group LLP; Jeffrey S. Standley; Adam J. Smith

(57) ABSTRACT

A low-power electronic pipette has a charging management module (10), a control module (20), a motor driving module (30), a display module (40), a communication module (50), a sensing module (60), and a battery module (70). The charging management module, the communication module, and the sensing module are each in two-way communication with the control module. The display module and the motor driving module are each in one-way communication with the control module. The battery module supplies energy to the low-power electronic pipette. When the sensing module acquires a signal and determines that the low-power electronic pipette has not been operated for a predetermined period and is not in a charging state, the low-power electronic pipette enters a low-power mode, in which the control module turns off the charging management module, the motor driving module, the display module, and the communication module, and the control module enters a sleep state.

17 Claims, 3 Drawing Sheets

(58) Field of Classification Search
CPC ....... B01L 2200/143; B01L 2300/0627; B01L 2300/0663
See application file for complete search history.

(56) References Cited

U.S. PATENT DOCUMENTS

| | | | |
|---|---|---|---|
| 2008/0011042 A1* | 1/2008 | Molitor ................. | G01F 11/029 73/1.74 |
| 2009/0000350 A1 | 1/2009 | Magnussen et al. | |
| 2009/0000403 A1* | 1/2009 | Magnussen ........... | B01L 3/0237 73/864.18 |
| 2009/0071266 A1* | 3/2009 | Nelson ................. | B01L 3/0234 73/864.11 |
| 2009/0074622 A1* | 3/2009 | Kalamakis ............ | G06F 1/1626 422/400 |
| 2012/0291567 A1* | 11/2012 | Homberg .............. | B01L 3/0237 73/864.13 |

* cited by examiner

LOW-POWER ELECTRONIC PIPETTE

CROSS-REFERENCE TO RELATED APPLICATIONS

This application makes a claim of priority to Chinese application CN 202010582203.1, filed on 23 Jun. 2020, which is incorporated by reference as if fully recited herein.

TECHNICAL FIELD

The disclosed invention relates to the field of liquid handling devices used for transferring and measuring liquids, and in particular, to a low-power electronic pipette.

BACKGROUND ART

Electronic pipettes are generally used in biological, chemical, biochemical, and other such laboratories. In experiments, pipettes are used for handling and transfer of fluid samples.

In some cases, it is required that a rechargeable electronic pipette's battery power may be used for a long time after a relatively short duration of charging, especially when the battery power is low. For example, it would be advantageous for an electronic pipette to work for one hour after five minutes charging.

When an electronic pipette is in a static state, its power consumption should be reduced to a microwatt level so as to ensure that the standby time is at least half a year after the electronic pipette is fully charged. In case an operator intends to perform an activity using the electronic pipette, the electronic pipette needs to display a current status of charge in the battery in order to let the operator decide whether to use the electronic pipette at the given moment.

When in active mode, the electronic pipette needs to ensure low power consumption to prolong its battery life. In the active mode, the electronic pipette is responsible for communication and motor control, and is operable to handle and transfer fluid samples. When in laboratory environment, the electronic pipette should minimize its electromagnetic radiation to avoid interference with other measuring devices.

The electronic pipette needs to display a current charging status and battery power, to assist the operator in making reliable predictions rather easily. The electronic pipette needs to have a communication function to enable it to be integrated into systems easily for achieving automatic or semi-automatic control.

However, existing electronic pipettes generally do not have the low-power mode or are switched from the low-power mode to the active mode manually by means of a button. Such a button activation manner will affect the scheme of appearance, waterproof design, or will cause a false operation.

In view of this, the applicant's inventors have developed a low-power electronic pipette that is capable of overcoming the foregoing technical problems.

SUMMARY OF INVENTION

The technical problem to be solved by the present invention is the inability to move an electronic pipette from its active mode (in which the electronic pipette is operable to handle and transfer fluid samples) into a low-power mode (in which parts of the electronic pipette are turned off) automatically, particularly without using a button-type switch that affects the structural design of the pipette. To this end, a low-power electronic pipette is disclosed herein.

The present invention solves the above technical problems by means of the following technical solution in which there is provided a low-power electronic pipette, which comprises a charging management module, a control module, a motor driving module, a display module, a communication module, a sensing module, and a battery module. The charging management module, the communication module, and the sensing module each are in a two-way communication with the control module. The display module and the motor driving module each are in a one-way communication with the control module. The control module controls the display module and the motor driving module. The battery module is configured to supply energy to the low-power electronic pipette.

The low-power electronic pipette enters a low-power mode when the sensing module acquires a signal that is indicative of the low-power electronic pipette having remained inoperative, namely unused and at rest, for a specified period and of a non-charging state of the low-power electronic pipette, in which the low-power electronic pipette is either not connected to a charger or has a full battery. When the low-power electronic pipette enters the low-power mode, the control module turns off the charging management module, the motor driving module, the display module, and the communication module, and the control module enters a sleep state in which the control module is configured to consume a minimum amount of power.

According to an embodiment of the present invention, the control module comprises a microcontroller, a voltage monitoring module, and an electrically erasable programmable memory. The microcontroller is configured to switch the low-power electronic pipette between an active mode and the low-power mode. The voltage monitoring module is configured to provide a normal working voltage for the low-power electronic pipette, and the electrically erasable programmable memory is configured to store information. It is also envisaged to use other memory storage techniques such as Ferroelectric RAM (FRAM), Flash, etc.

According to an embodiment of the present invention, the charging management module is in communication with the microcontroller for performing charging and discharging management.

According to an embodiment of the present invention, the charging management module is configured to provide a charging voltage of 4.5 V to 12 V.

According to an embodiment of the present invention, the sensing module comprises an acceleration sensor electrically connected to the microcontroller and configured to generate an output signal. The microcontroller determines whether an operator activity (i.e., an operator using, adjusting, or otherwise manipulating the low-power electronic pipette) is occurring or has ceased based on the output signal generated by the acceleration sensor.

The microcontroller switches the low-power electronic pipette to enter the active mode and displays an electric power status, including the state of charge of the battery and whether the low-power electronic pipette is connected to a charger, upon determining that the operator activity has resumed.

The microcontroller switches the low-power electronic pipette to enter and remain in the active mode upon determining that the low-power electronic pipette is in the charging state even though the operator activity has ceased.

The microcontroller switches the low-power electronic pipette to enter the low-power mode following the display of the electric power status upon determining that the operator activity has ceased and the low-power electronic pipette is not in the charging state.

According to an embodiment of the present invention, the sensing module further comprises a capacitive touch switch that is electrically connected to the microcontroller.

The sensing module detects a charging state signal by integrating the signals detected by the capacitive touch switch and the acceleration sensor, wherein the sensing module determines whether the operator activity on the low-power electronic pipette is occurring or has ceased.

The microcontroller switches the low-power electronic pipette to enter the active mode and displays an electric power status upon determining that the operator activity has resumed. The microcontroller switches the low-power electronic pipette to enter and remain in the active mode upon the sensing module determining that the low-power electronic pipette is in the charging state even though the operator activity has ceased. The microcontroller switches the low-power electronic pipette to enter the low-power mode following the display of the electric power status upon the sensing module determining that the low-power electronic pipette is not in the charging state and the operator activity has ceased.

According to an embodiment of the present invention, the sensing module further comprises a micro switch that is electrically connected to the microcontroller and capable of detecting a trigger signal, which is an indication that an operator is directing the low-power electronic pipette to perform a liquid handling operation.

The microcontroller switches the low-power electronic pipette from the low-power mode to the active mode when the micro switch detects the trigger signal.

According to an embodiment of the present invention, the motor driving module comprises a motor connected to a microcontroller, and an analog switch for controlling the motor. The motor driving module adjusts the liquid suction or discharge speed of the low-power electronic pipette by a constant voltage. The constant voltage is output by the power supply module under the control of the microcontroller.

According to an embodiment of the present invention, the communication module comprises a USB device, a Bluetooth device, or a near-field communication (NFC) device.

According to an embodiment of the present invention, the display module comprises an LED display or an LCD display, configured to display information.

The positive and advanced effects of the present invention are explained in the ensuing paragraphs.

In this present invention, the low-power electronic pipette adopts an integrated sensing of the acceleration sensor, the capacitive touch switch, and the micro switch to move the low-power electronic pipette from one power state to the other. Such a structure is conducive to the scheme of appearance of the pipette and enables waterproof design. The low-power electronic pipette can be switched from the low-power mode to the active mode in which state it displays the remaining electric power as soon as the customer picks up the device, thus making the pipette smart.

The low-power electronic pipette features long standby time, low working power consumption, intelligent sensing, and the like. It also has a communication function, and can be extended to an IoT application. In addition, the low-power electronic pipette features intelligent activation, fast response speed, and lower power consumption of the motor. The low-power electronic pipette is therefore well suited as a portable rechargeable biochemical device, which has a short-range communication function and a low-power motor.

BRIEF DESCRIPTION OF THE DRAWINGS

The above and other features, properties and advantages of the disclosed invention will become clearer based on the description below in conjunction with the accompanying drawings and embodiments, and the same features are always indicated by the same reference numerals in the figures, and in which.

DETAILED DESCRIPTION OF EMBODIMENTS

Figure 1:
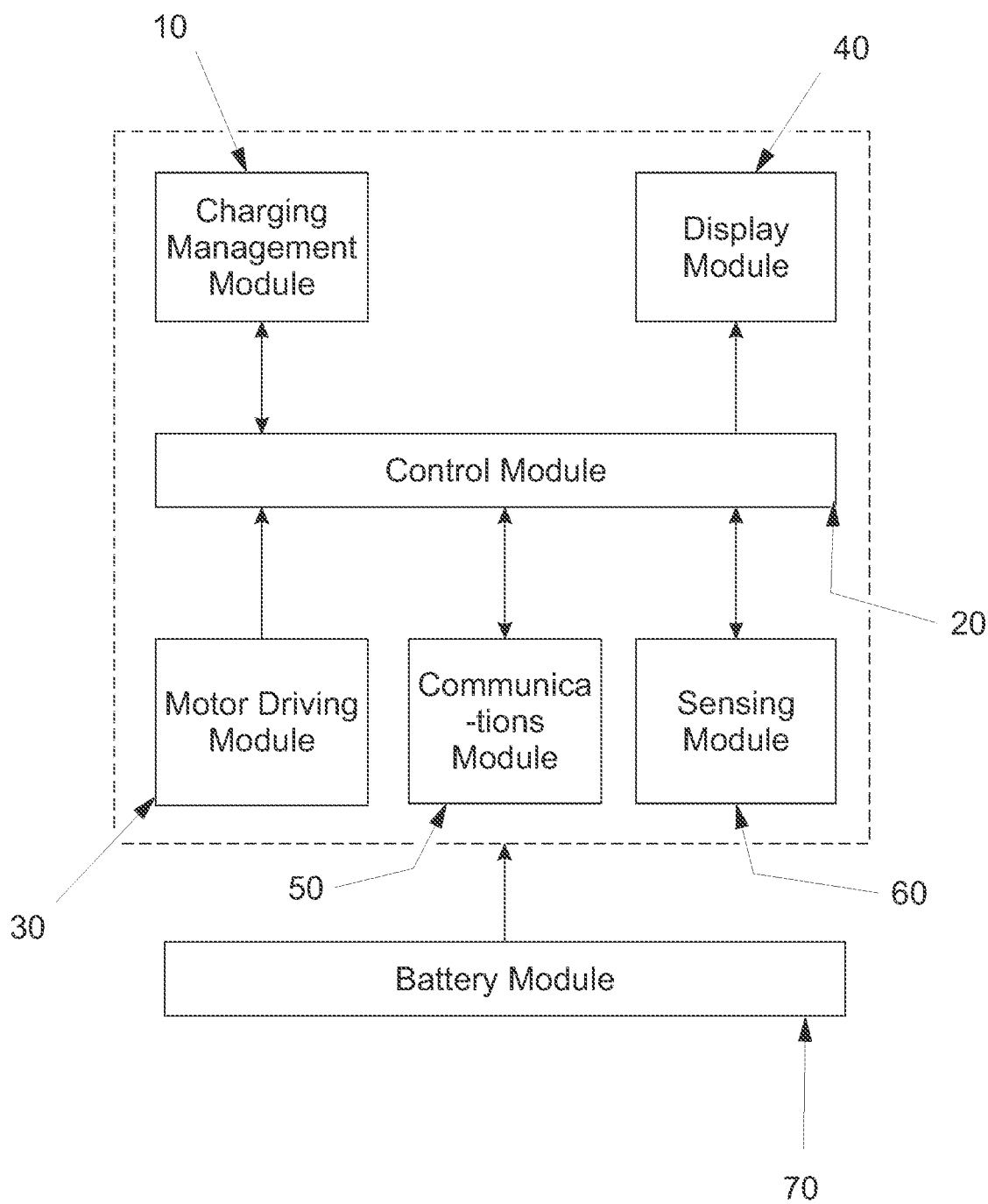
FIG. 1 is a schematic diagram of a principle of an electronic pipette adapted for low power operation.

To make the above objects, features and advantages of the present invention more apparent and easier to understand, specific implementations of the present invention are described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, the applicant, according to his or her determination, may have selected some of the terms mentioned in the description of the present invention, and the detail meaning thereof is described in the relevant section described herein.

Furthermore, the present invention must be understood, not simply by the actual terms used but also by the meanings encompassed by each term.

FIG. 1 is a schematic diagram of a low-power electronic pipette according to the present invention.

As shown in FIG. 1, the present invention discloses a low-power electronic pipette, which comprises a charging management module 10, a control module 20, a motor driving module 30, a display module 40, a communication module 50, a sensing module 60, and a battery module 70. The charging management module 10, the communication module 50, and the sensing module 60 each are in two-way communication with the control module 20. The display module 40 and the motor driving module 30 each are in one-way communication with the control module 20. The control module 20 controls the display module 40 and the motor driving module 30. The battery module 70 is configured to supply energy to the low-power electronic pipette.

When the sensing module 60 acquires a signal and determines that the low-power electronic pipette has not been operated for a specific period and is not in a charging state, the low-power electronic pipette enters a low-power mode. The control module 20 turns off the charging management module 10, the motor driving module 30, the display module 40, and the communication module 50, and the control module 20 enters a sleep state in which the control module is configured to consume a minimum amount of power.

Figure 2:
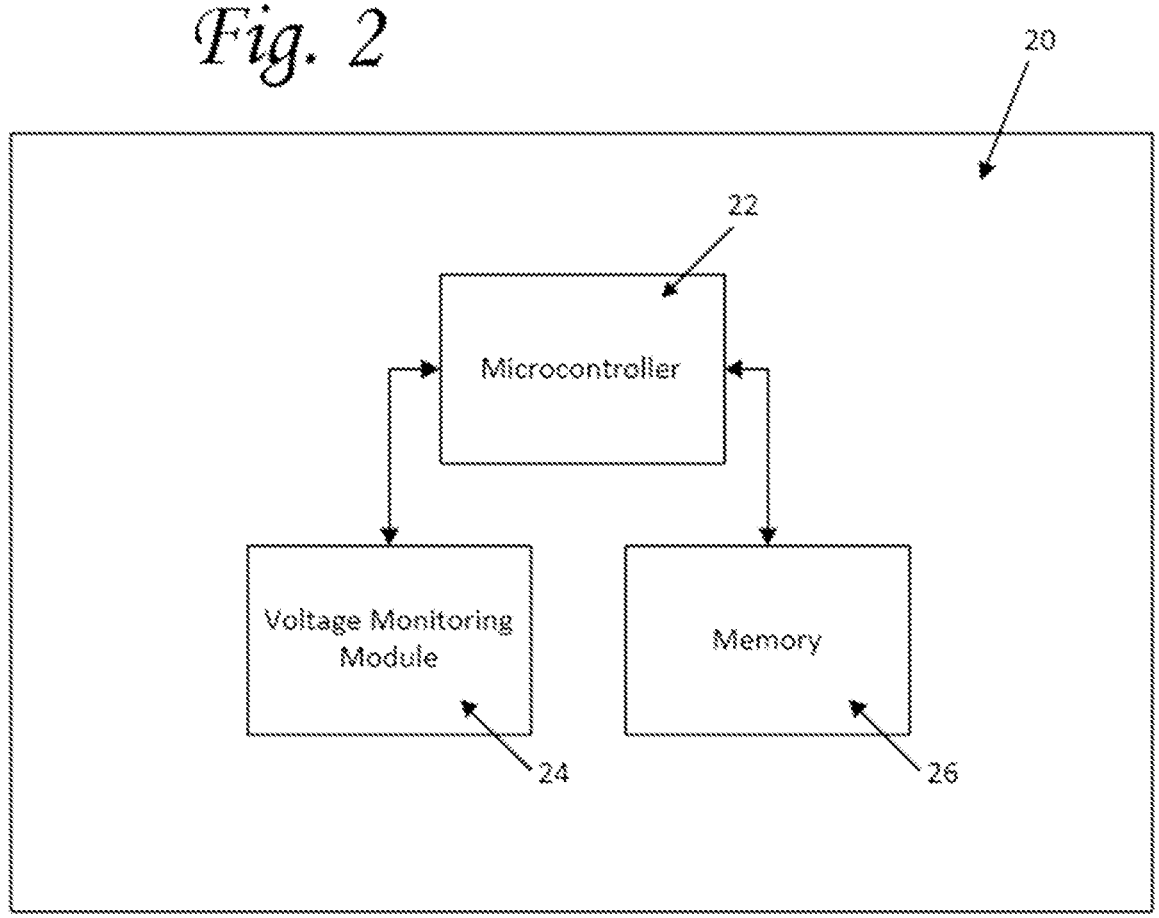
FIG. 2 is a schematic diagram illustrating modules that make up a control module.

Referring now to FIG. 2, the control module 20 preferably comprises a microcontroller 22, a voltage monitoring module 24, and an electrically erasable programmable memory 26, such as an EEPROM, a flash memory module, or an FRAM. The microcontroller 22 is configured to switch the low-power electronic pipette state between an active mode and low-power mode. The voltage monitoring module 24 is configured to provide a normal working voltage for the low-power electronic pipette, and the electrically erasable programmable memory 26 is configured to store information.

Further, the charging management module 10 interacts with the microcontroller 22 to perform charging and discharging management. A charging voltage of the charging management module 10 is preferably from 4.5 V to 12 V. The charging voltage depends on the battery module 70. The foregoing preferable charging voltage values are merely examples rather than limitations.

Herein, a charging current is adjusted based on battery power to realize a fast-charging function. A trickle charging is performed when the electric power is almost full in order to protect the battery. The rechargeable battery can be a lithium polymer or a lithium ion battery. A voltage divider resistor and an operational amplifier implement electric power detection. Due to the frequent electric power detection, the divider resistor and the operational amplifier are used together for electric power measurement to ensure accuracy of AD conversion of the microcontroller.

Still further, the sensing module 60 comprises an acceleration sensor, wherein the acceleration sensor is electrically connected to the microcontroller, and the microcontroller 22 determines, by collecting a trigger signal output by the acceleration sensor, whether an operator is using or has ceased to use the low-power electronic pipette.

If the microcontroller 22 determines that the operator activity has resumed, an electric power status is displayed, including the state of charge of the battery and whether the low-power electronic pipette is connected to a charger, and the microcontroller controls the low-power electronic pipette to enter the active mode. On the contrary, if the microcontroller 22 determines that the operator activity has ceased for a period of time, the sensing module 60 first determines whether the low-power electronic pipette is in the charging state. If the low-power electronic pipette is in the charging state, the microcontroller 22 controls the low-power electronic pipette to enter the active mode. Alternatively, if the low-power electronic pipette is not in the charging state, the low-power electronic pipette enters the low-power mode after the electric power status is shortly displayed.

Preferably, the sensing module 60 further comprises a capacitive touch switch, wherein the capacitive touch switch is electrically connected to the microcontroller. When the sensing module 60 detects a charging state signal, integrating the signals detected by the capacitive touch switch and the acceleration sensor, the sensing module determines whether the operator is about to use the low-power electronic pipette.

If the microcontroller determines that the operator is about to use the low-power electronic pipette, an electric power status is displayed, and the microcontroller 22 controls the low-power electronic pipette to enter the active mode. If the microcontroller 22 determines that the operator has not used the low-power electronic pipette for a period of time, the sensing module 60 first determines whether the low-power electronic pipette is in the charging state. In case the low-power electronic pipette is in the charging state, the microcontroller 22 controls the low-power electronic pipette to enter the active mode. If the low-power electronic pipette is not in the charging state, the low-power electronic pipette enters the low-power mode after the electric power status is shortly displayed.

In addition, the sensing module 60 further comprises a micro switch, wherein the micro switch is electrically connected to the microcontroller. If the micro switch detects a trigger signal either from the acceleration sensor or the capacitive touch sensor, the microcontroller 22 switches the low-power electronic pipette from the low-power mode to the active mode.

The microcontroller 22 is capable of entering the active state or the low-power state. In the low-power mode, the microcontroller 22 shuts down corresponding power-consuming applications, and enters a sleep or deep sleep state to reduce power consumption. When the micro switch, the capacitive touch switch or the acceleration sensor detects an external trigger signal, the microcontroller 22 is activated to enter the sleep state. The electrically erasable programmable memory 26 may be configured to store information. Content of the information includes but not limited in system configuration information, battery information, and the like. The voltage monitoring module 24 is configured to ensure a normal working voltage of a system.

Figure 3:
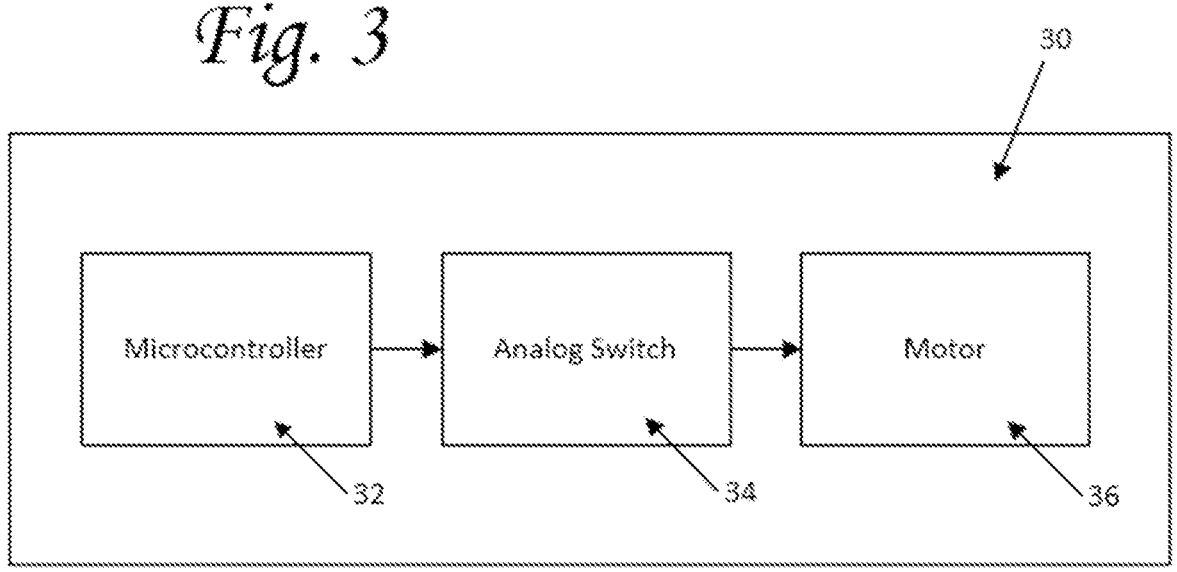
FIG. 3 is a schematic diagram illustrating modules that make up a motor driving module.

Preferably, and as seen in FIG. 3, the motor driving module 30 comprises a motor 36, an analog switch 34 for controlling the motor, and the like. The motor 36 connects to a microcontroller 32, which controls the battery module 70 to output a constant voltage to adjust the liquid suction or discharge speed of the pipette of the motor. The microcontroller 32 controls the low-power electronic pipette to enter the low-power mode by turning off unnecessary peripheral circuit, and the sensing sensor to reduce standby power consumption.

In addition, the communication module 50 includes a USB device, a Bluetooth device, or a near-field communication device (such as NFC or RFID). The USB device, the Bluetooth device, or the NFC device may implement two-way communication. The RFID (radio frequency identification) device may implement one-way communication. The display module 40 comprises a LED, a display, or the like, and is configured to display information. Herein, the display is not limited to a TFT, a segment code screen, or the like. There may be one or more LEDs, and the types are not limited. The display module 40 is configured to display information such as battery power and a charging state.

For example, the communication module 50 may comprise one or more of an USB device, a Bluetooth device, an NFC (near-field communication) device, an RS232 interface, a radio frequency identification (RFID) device, or the like. The Bluetooth device and the USB device may be used for long-range communication, and content of the communication is not limited to battery power information, a battery life, a pipette ID, and the like. The NFC is used for near-field shorter range communication, and content of the communication is not limited to a Bluetooth ID, a configuration setting, and the like.

According to the foregoing structural description, the low-power management mechanism of the low-power electronic pipette of the present invention is mainly accomplished by the acceleration sensor, the capacitive touch switch, the micro switch, and the microcontroller. The entire system has several modes, which includes the active mode and the low-power mode.

Assuming that the microcontroller is in the low-power mode, the following three cases may exist:

In a first case, the acceleration sensor is always in the active state, and once a vibration exceeds a threshold, the acceleration sensor outputs a logic signal to trigger the microcontroller. Once the microcontroller detects the trigger signal from the acceleration sensor, the low-power electronic pipette enters the active mode from the low-power mode. The microcontroller collects the signal output by the acceleration sensor to determine whether an operator is intending to use the low-power electronic pipette and whether the low-power electronic pipette is in the charging state. If the microcontroller determines that the operator is intending to use the low-power electronic pipette, an electric power status is displayed, and the microcontroller controls the system to enter the active mode. If the microcontroller determines that the operator is not using the low-power electronic pipette for a period of time, the microcontroller determines whether the low-power electronic pipette is in the charging state. If the low-power electronic pipette is in the charging state, the microcontroller enters the active mode. If the low-power electronic pipette is not in the charging state, the system enters the low-power mode after the electric power status is shortly displayed.

In a second case, the capacitive touch switch is optionally used to assist the acceleration sensor. If the capacitive touch switch detects a signal, the signal is fused with the signal of the acceleration sensor to determine whether an operator is intending to use the low-power electronic pipette and whether the low-power electronic pipette is in the charging state. If the microcontroller determines that the operator is about to use the low-power electronic pipette, the electric power status is displayed, and the microcontroller controls the low-power pipette to enter the active mode. If the microcontroller determines that the operator is not intending to use the low-power electronic pipette for a period of time, the microcontroller determines whether the low-power electronic pipette is in the charging state. If the low-power electronic pipette is in the charging state, the microcontroller controls the low-power pipette to enter the active mode. If the low-power electronic pipette is not in the charging state, the low-power pipette enters the low-power mode after the electric power status is shortly displayed to the operator.

In a third case, the micro switch is used as a single signal. If a trigger signal is detected, the microcontroller enters the active mode from the low-power mode, regardless of whether the low-power electronic pipette is in the charging state.

The three cases that are in an "OR" relationship show the activation methods for the low-power electronic pipette from the low-power mode to the active mode, offering a seamless experience to the operators.

By default, the low-power electronic pipette is in the active mode. If the microcontroller detects inactivity of the electronic pipette for a specified period, after analyzing the signal of the acceleration sensor, and the electronic pipette is not in the charging state, and the micro switch and the capacitive touch switch do not have any trigger signal within a specific period, the system enters low-power mode.

In addition, the motor consumes the highest amount of power within the entire system in the active mode. A low-voltage DC motor pump is used to reduce power consumption for liquid suction/discharge work. The motor working voltage is lower than the battery voltage of the pipette. A switch buck circuit powers the motor. It is different from the conventional solution in which the liquid suction/discharge speed of the pipette is controlled by the power state of a motor. The low-power electronic pipette of the present invention reduces liquid suction/discharge power consumption by adjusting a DC motor working voltage. Thereby, it greatly reduces the number of impulse current when the motor is starting. It is not only beneficial to power consumption reduction, but also beneficial to battery protection.

Moreover, wireless communication is also one of the factors of high power consumption within the entire system in the active mode. The low-power electronic pipette of the present invention uses periodical scanning. During a scanning interval, a wireless communication module is in the low-power mode, such that the power consumption of wireless communication is reduced, and battery life is prolonged.

In conclusion, in the low-power electronic pipette of the present invention, the acceleration sensor, the capacitive touch switch, and the micro switch perform fused sensing, which adopts a passive form. Such a structure is conducive to the appearance design and the waterproof design. The low-power electronic pipette can be switched from the low-power mode to the active mode and displays the remaining electric power of the pipette, the moment an operator picks up the electronic pipette. This makes the pipette as an intelligent and smart device.

The low-power electronic pipette features long standby time, low working power consumption, intelligent sensing, and the like. It has a communication function, and can be extended to an IoT application. In addition, the low-power electronic pipette features intelligent activation, faster response speed and lower power consumption for motor working. The low-power electronic pipette is therefore well suited as a portable rechargeable biochemical device, which has a short-range communication function and a low-power motor.

Although the specific implementations of the present invention are described above, those skilled in the art should understand that these are merely examples. The protection scope of the present invention is defined by the appended claims. Those skilled in the art can make various alterations or modifications to these implementations without departing from the principle and essence of the present invention. However, these alterations and modifications all fall within the scope of protection of the present invention.

REFERENCE SIGNS LIST

Charging management module 10
Control module 20
Microcontroller 22
Voltage monitoring module 24
Memory 26
Motor driving module 30
Microcontroller 32
Analog switch 34
Motor 36
Display module 40
Communication module 50
Sensing module 60
Battery module 70

What is claimed is:

1. An electronic pipette, comprising:
a communication module;
a sensing module;
a charging management module, configured in two-way communication with each of the communication module and the sensing module;
a motor driving module;
a display module;

a control module, configured in one-way communication to control each of the motor-driving module and the display module; and a battery module, configured to supply energy to at least the sensing module, the motor driving module, the display module, and the control module;

wherein the control module is configured to, in response to receiving a signal indicative of inoperativeness of the electronic pipette for a predetermined period of time and of a non-charging state of the electronic pipette from the sensing module, cause the electronic pipette to enter a mode ("low-power mode") with reduced power consumption compared to an active mode of the electronic pipette in which the electronic pipette is operable to handle and transfer fluid samples, wherein the control module is configured to, as part of entering the low-power mode:

turn off the charging management module, the motor driving module, the display module, and the communication module; and enter a sleep state.

2. The electronic pipette of claim 1, wherein the control module comprises:

a microcontroller, configured to switch the electronic pipette between the active mode and the low-power mode;

a voltage monitoring module, configured to provide a working voltage for the electronic pipette; and an electrically erasable programmable memory, configured to store information.

3. The electronic pipette of claim 2, wherein the charging management module is in communication with the microcontroller for performing charging and discharging management.

4. The electronic pipette of claim 3, wherein the charging management module is configured to provide a direct current charging voltage in the range of from 4.5 to 12 volts.

5. The electronic pipette of claim 2, wherein:

the sensing module comprises an acceleration sensor electrically configured to generate an output signal; and the microcontroller uses the output signal from the sensing module to determine whether an operator activity is occurring or has ceased.

6. The electronic pipette of claim 5, wherein, upon determining that operator activity has resumed, the microcontroller is configured to cause the electronic pipette to enter the active mode and cause the display module to display an electric power status.

7. The electronic pipette of claim 5, wherein, upon determining that the electronic pipette is in the charging state, the microcontroller is configured to cause the electronic pipette to enter the active mode, where it remains, even if operator activity has ceased.

8. The electronic pipette of claim 5, wherein, upon determining that the operator activity has ceased for a predetermined time period and that the electronic pipette is not in the charging state, the microcontroller is configured to cause the electronic pipette to enter the low-power mode after causing the display module to display an electric power status.

9. The electronic pipette of claim 5, wherein:

the sensing module further comprises a capacitive touch switch, wherein the sensing module is configured to integrate an output signal of the capacitive touch switch with the output signal of the acceleration sensor to determine a charging state of the electronic pipette and send a signal to the microcontroller as to whether the operator activity on the electronic pipette is occurring or has ceased;

upon determining that the operator activity has resumed, the microcontroller is configured to cause the electronic pipette to enter the active mode and cause the display module to display an electric power status;

upon the sensing module determining that the electronic pipette is in the charging state even though the operator activity has ceased, the microcontroller is configured to cause the electronic pipette to enter and remain in the active mode; and upon the sensing module determining that the electronic pipette is not in the charging state and the operator activity has ceased for a predetermined time period, the microcontroller is configured to cause the electronic pipette to enter the low-power mode after causing the display mode to display the electric power status.

10. The electronic pipette of claim 9, further comprising:

a micro switch of the sensing module that is electrically connected to the microcontroller, configured to detect a trigger signal that, if detected by the micro switch, causes the microcontroller to switch the electronic pipette from the low-power mode to the active mode, the trigger signal being generated by at least one of: the acceleration sensor or the capacitive touch sensor.

11. The electronic pipette of claim 1, wherein the motor driving module comprises:

a microcontroller;

a motor connected to the microcontroller; and an analog switch under control of the microcontroller for controlling the motor;

wherein the motor driving module is configured to adjust a liquid suction or discharge speed of the electronic pipette by a constant voltage that is output by the power supply module under control of the microcontroller.

12. The electronic pipette of claim 1, wherein the communication module comprises a universal serial bus ("USB") device.

13. The electronic pipette of claim 1, wherein the communication module comprises a short-range wireless technology device, operating under the BLUETOOTH standard.

14. The electronic pipette of claim 1, wherein the communication module comprises a near-field communication ("NFC") device.

15. The electronic pipette of claim 1, wherein the display module comprises a light-emitting diode ("LED") display configured to display information.

16. The electronic pipette of claim 1, wherein the display module comprises a liquid crystal display ("LCD") configured to display information.

17. The electronic pipette of claim 5, further comprising:

a micro switch of the sensing module that is electrically connected to the microcontroller and configured to detect a trigger signal generated by the acceleration sensor that, if detected by the micro switch, causes the microcontroller to switch the electronic pipette from the low-power mode to the active mode.

* * * * *